(12) United States Patent
Sasaki

(10) Patent No.: US 6,215,740 B1
(45) Date of Patent: Apr. 10, 2001

(54) CONTROL METHOD FOR OPTICAL DISK DRIVE CAPABLE OF ACCESSING TO TARGET TRACK QUICKLY AND THE OPTICAL DISK DRIVE

(75) Inventor: Takeshi Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/228,758

(22) Filed: Jan. 12, 1999

(30) Foreign Application Priority Data

Jan. 12, 1998 (JP) .................................................. 10-004039

(51) Int. Cl.$^7$ ....................................................... G11B 7/00
(52) U.S. Cl. ..................... 369/44.28; 369/44.37; 369/124.02; 369/124.03
(58) Field of Search ............................ 369/44.27, 44.28, 369/44.29, 44.31, 44.37, 44.38, 47, 50, 53, 54, 124.02, 124.03; 360/78.04, 78.06

(56) References Cited

U.S. PATENT DOCUMENTS

| 4,796,246 | * | 1/1989 | Tsuyoshi et al. | 369/44.29 |
| 5,182,736 | * | 1/1993 | Yanagi | 369/44.28 X |
| 5,255,253 | * | 10/1993 | Kagami et al. | 369/44.28 |

FOREIGN PATENT DOCUMENTS

| 61-177641 | 8/1986 | (JP) . |
| 3-88129 | 4/1991 | (JP) . |
| 9-204670 | 8/1997 | (JP) . |

\* cited by examiner

Primary Examiner—Paul W. Huber
(74) Attorney, Agent, or Firm—Foley & Lardner

(57) ABSTRACT

A control method for an optical disk drive is disclosed. In the control method, first and second light beams output from an optical head are irradiated to an optical disk. Information is recorded or reproduced using the first light beam, and information is deleted using the second light beam. The control method consists of steps described below. At a step, the moving velocity of the first light beam is calculated, and the moving velocity of the first light beam is controlled so that the moving velocity varies in conformity to a first velocity profile predetermined. Herein, the first velocity profile is pre-set to assist the first light beam in reaching a target track for the shortest time. At the next step, the position of the optical head is controlled so that the optical head follows the first light beam. At the next step, if the first light beam is accelerating or traveling at a constant velocity, the position of the second light beam is controlled so that the second light beam follows the optical head. At the next step, if the first light beam starts decelerating, data of a distance of the second light beam to the target track is updated using data of a distance of the first light beam to the target track. At the next step, if the first light beam is decelerating, the moving velocity of the second light beam is calculated. The moving velocity of the second light beam is controlled so that the moving velocity varies in conformity to a second velocity profile predetermined.

8 Claims, 6 Drawing Sheets

CONTROL METHOD FOR OPTICAL DISK DRIVE CAPABLE OF ACCESSING TO TARGET TRACK QUICKLY AND THE OPTICAL DISK DRIVE

BACKGROUND OF THE INVENTION

The present invention relates to a two-beam pickup type optical disk drive for irradiating two light beams to an optical disk, recording or reproducing information using one of the light beams, and deleting information using the other light beam.

In the past, a one-beam pickup type optical disk drive have been employed in irradiating one light beam (for example, laser light) to an optical disk and thus recording, reproducing, or deleting information. In general, the one-beam pickup type optical disk drive uses a voice coil motor (will be abbreviated to a VCM) and a lens actuator (incorporated in an optical head) to move the light beam to a track in which information is recorded. The voice coil motor drives the optical head that is an output source of a light beam, and the lens actuator drives a condenser, which converges the light beam, in a radial direction of the optical disk. The one-beam pickup type optical disk drive is disclosed in, for example, Japanese Unexamined Patent Publication (JP-A) No. 61-177641.

The one-beam pickup type optical disk drive will be briefed below. The optical disk drive has a velocity profile representing a pattern of moving velocities that should be assumed by a light beam traveling from any position to a target track. In other words, the velocity profile represents the variation of a function of time required to enable the light beam to reach the target track for the shortest time. The velocity profile is pre-set when the target track is determined.

For enabling a light beam to reach a target track, a positional deviation of the light beam from the target track is detected. The VCM is used to control the position of an optical head so that the positional deviation will become nil. A lens actuator is used to give control so that the pattern of moving velocities assumed by the light beam until the light beam reaches the target track will agree with a velocity profile. The moving velocity of the light beam is calculated by counting the number of tracks traversed by the light beam within a certain time (hereinafter, the number of traversed tracks).

On the other hand, a two-beam pickup type optical disk drive has been disclosed in, for example, Japanese Unexamined Patent Publication (JP-A) No. 3-88129. The two-beam pickup type optical disk drive irradiates two light beams to an optical disk, records or reproduces information using one of the light beams, and deletes information using the other light beam.

However, in the two-beam pickup type optical disk drive of the prior art disclosed in the Japanese Unexamined Patent Publication No. 3-88129. The actions for bringing the second light beam to a tracking state are unstable. It therefore takes much time for the first light beam and second light beam to enter the tracking state. This poses a problem in that it takes much time to access a target time.

The present applicant has proposed a two-beam pickup type optical disk drive in an effort to solve the foregoing problems. The disk drive is disclosed in Japanese Unexamined patent Publication (JP-A) No. 9-204670.

In the optical disk drive described in the patent publication, a first tracking control unit calculates the moving velocity of the first light beam from the number of tracks traversed by the first light beam. The velocity is controlled so that the velocity varies in conformity to a predetermined velocity profile. The position of an optical head is controlled so that the optical head follows the first light beam.

Moreover, when the first light beam is accelerating or traveling at a constant velocity, a second tracking control unit controls the position of a second light beam so that the second light beam follows the optical head. Furthermore, the number of remaining tracks ending with a target track of the second light beam is calculated from the number of tracks traversed by the second light beam. While the first light beam is decelerating, the moving velocity of the second light beam is calculated from the number of tracks traversed by the second light beam. The velocity of the second light beam is controlled so that the velocity varies in conformity to the predetermined velocity profile.

However, a problem underlies the optical disk drive described in the Japanese Unexamined Patent Publication No. 9-204670. Specifically, assuming that the first light beam is accelerating or traveling at a constant velocity, a large error may occur in the count of tracks traversed by the first light beam or second light beam. In this case, the position of the first light beam having reached a target track and the position of the second light beam having reached it are greatly deviated from each other in a radial direction. Consequently, the actions for bringing the light beams to a tracking state get unstable.

Factors causing the large error in the count of tracks traversed by the first light beam or second light beam include a defect in an optical disk, a flaw thereon, and deterioration in quality of a tracking error signal. Consequently, the count of tracks may indicate a smaller number of tracks than the number of actually traversed tracks.

Moreover, even when the count of tracks traversed by the second light beam indicates a larger number of tracks than the number of actually traversed tracks, the actions for bringing the second light beam to the tracking state get unstable.

SUMMARY OF THE INVENTION

To solve the problem underlying the prior arts, an object of the present invention is to provide a control method for a two-beam pickup type optical disk drive. In the control method, the time required to access a target track is shortened by stabilizing the actions for bringing light to a tracking state.

It is another object of the present invention to provide an optical disk drive capable of performing the control method.

The other objects, features, and advantages of the present invention will become clear as the following description proceeds.

A control method to which the present invention is applicable is for use in an optical disk drive which has an optical head, the optical head irradiating an optical disk by first and second light beams, the optical disk drive recording or reproducing information by using the first light beam and deleting information by using the second light beam. According to an aspect of the present invention, the method comprises the steps of calculating the moving velocity of the first light beam and controlling the moving velocity of the first light beam so that the first light beam reaches a target track on the optical disk for the shortest time and that the moving velocity varies in conformity to a first velocity profile predetermined, controlling the position of the optical head so as to follow the first light beam, while the first light beam is accelerating or traveling at a constant velocity, controlling the position of the second light beam so that the second light beam follows the optical head, when the first light beam starts decelerating, updating data of a distance of the second light beam to the target track using data of a distance of the first light beam to the target track, and while the first light beam is decelerating, calculating the moving velocity of the second light beam and controlling the moving velocity of the second light beam so that the moving velocity varies in conformity to a second velocity profile predetermined.

According to the present invention, there is also provided an optical disk which comprises a first optical system outputting a first light beam used to record or reproduce information, a second optical system outputting a second light beam used to delete information, an optical head having the first and the second optical systems mounted therein and being controlled so that the first and the second optical systems can move in a radial direction of an optical disk, a first position detecting unit for detecting the position of the first light beam in the radial direction of the optical disk, a second position detecting unit for detecting the position of the second light beam in the radial direction of the optical disk, and an arithmetic unit for performing arithmetic operations to move the first and the second light beams onto a target track of the optical disk and to control the first and the second light beams so as to lock to the target track. The arithmetic unit performs the steps of calculating the moving velocity of the first light beam and controlling the moving velocity of the first light beam so that the first light beam reaches a target track on the optical disk for the shortest time and that the moving velocity varies in conformity to a predetermined velocity profile pre-set, controlling the position of the optical head so as to follow the first light beam, while the first light beam is accelerating or traveling at a constant velocity, controlling the position of the second light beam so that the second light beam follows the optical head, updating data of a distance of the second light beam to the target track using data of a distance of the first light beam to the target track when the first light beam starts decelerating, and calculating the moving velocity of the second light beam and controlling the moving velocity of the second light beam so that the moving velocity varies in conformity to the predetermined velocity profile while the first light beam is decelerating. The arithmetic unit then controls the moving velocity of the second light beam so that the moving velocity varies in conformity to the predetermined velocity profile.

According to the present invention, a moving velocity at which the second light beam reaches the target track is sufficiently low. Moreover, no error will be observed in detected data even when the first light beam is accelerating or traveling at a constant speed. Specifically, no error will be observed in the moving velocities of the first light beam and second light beam and the distances by which the first and second light beams have moved. The second light beam having reached the target track will not deflect largely from the optical head.

DESCRIPTION OF THE PREFERRED EMBODIMENTS

In order to facilitate an understanding of the present invention, description will at first be made with reference to the drawings about a conventional optical disk drive, disclosed in the proceeding referred to before.

Figure 1:
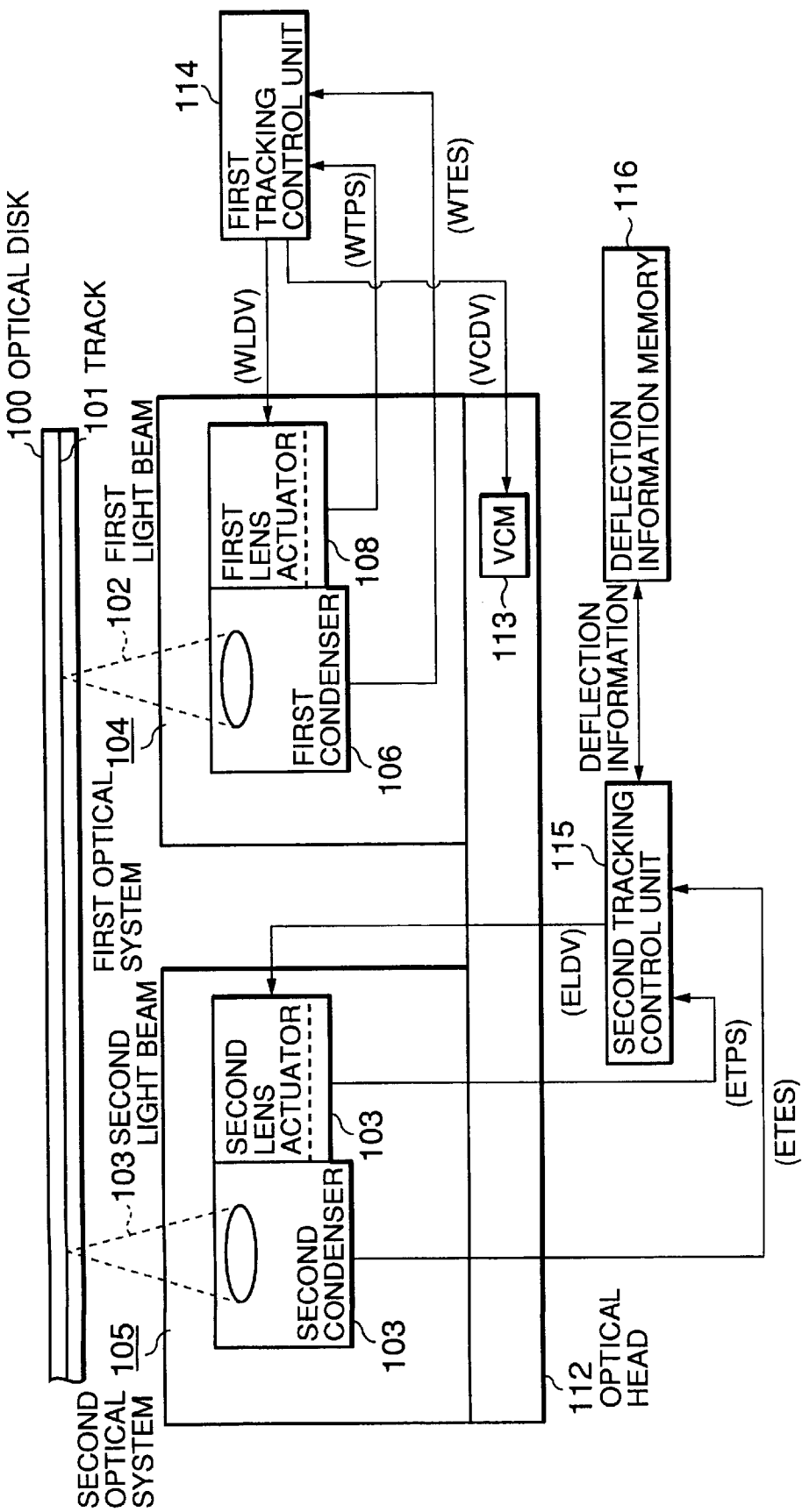
FIG. 1 is a block diagram showing the configuration of an optical disk drive in accordance with a prior art.

Referring to FIGS. 1, a two-beam pickup type optical disk drive will be described. The two-beam pickup type optical disk drive is analogous to the one disclosed in the Japanese Unexamined Patent Publication No. 3-88129. A first optical system 104 for recording or reproducing information using a first light beam 102 and a second optical system 105 for deleting information using a second light beam 103 are mounted in an optical head 112. The optical head 112 is driven in a radial direction of an optical disk 100 by a VCM 13. Incidentally, the term "radial direction" employed hereinafter means a radial direction of the optical disk 100.

The first optical system 104 includes a first condenser 106 and a first lens actuator 108. The first condenser 106 converges or irradiates the first light beam 102 on or to a track 101 on the optical disk 100. The first lens actuator 108 drives the first condenser 106 in a radial direction.

The first optical system 104 irradiates the first light beam 102 to the optical disk 100, and detects a positional deviation in a radial direction between the first light beam 102 and the center of the track. The first optical system 104 then outputs the positional deviation as a first tracking error signal WTES to a first tracking control unit 114 that will be described later.

The first lens actuator 108 drives the first condenser 106 in a radial direction according to a first lens actuator driving signal WLDV output from the first tracking control unit 114. The first lens actuator 108 has a lens position detector that is not shown. The lens position detector produces a first position signal WTPS indicating the position of the first optical system 104 and transmits the signal to the first tracking control unit 114.

The first tracking control unit 114 receives the first tracking error signal WTES output from the first optical system 104, and the first position signal WTPS. Moreover, the first tracking control unit 114 performs arithmetic operations to assist the first light beam 102 in tracking a target track. The first tracking control unit 114 outputs the first lens actuator driving signal WLDV, and a VCM driving signal VCDV serving as a driving command instructing driving of the optical head 112.

On the other hand, the second optical system 105 includes a second condenser 107 and a second lens actuator 109. The second condenser 107 converges or irradiates the second light beam 103 on or to a target track on the optical disk 107. The second lens actuator 109 drives the second condenser 107 in a radial direction.

Moreover, the second optical system 105 irradiates the second light beam 103 to the optical disk 100, and detects a positional deviation in radial direction of the second light beam 103 from the target track. The second optical system 105 outputs the positional deviation as a second tracking error signal ETES to a second tracking control unit 115 that will be described later. The second lens actuator 109 drives the second condenser 107 in a radial direction according to a second lens actuator driving signal ELDV output from the second tracking control unit 115. The second lens actuator 109 includes a lens position detector that is not shown. The lens position detector produces a second position signal ETPS indicating the position of the second optical system 105 and transmits the signal to the second tracking control unit 114.

A deflection information memory 116 stores the position of the second optical system 105 relative to the optical head 112, which is attained when the second light beam 103 has tracked the target track, as deflection information.

The second tracking control unit 115 performs arithmetic operations according to the deflection information stored in the deflection information memory 116, so that the second light beam 103 will be irradiated to the target track. The second tracking control unit 115 outputs a second lens actuator driving signal ELDV used to drive the second lens actuator 109.

In the foregoing configuration, the first tracking control unit 114 uses a counter that is not shown to count the number of tracks traversed by the first light beam 102 within a certain time. The first tracking control unit 114 thus calculates the moving velocity of the first light beam 102. Moreover, the first tracking control unit 114 controls the first lens actuator 108 and VCM 113 so that the calculated moving velocity varies in conformity to a velocity profile.

On the other hand, the second tracking control unit 115 does not have the ability to count the number of tracks traversed by the second light beam 103. The second tracking control unit 115 therefore merely controls the position of the second light beam 103 according to information stored in the deflection information memory 116 and the second position signal ETPS.

However, a problem underlies the conventional two-beam pickup type optical disk drive like the one disclosed in the Japanese Unexamined Patent Publication No. 3-88129. Specifically, the actions for bringing the second light beam to a tracking state are unstable. It therefore takes much time for the first and second light beams to enter the tracking state. Moreover, it takes much time to access a target track.

As described above, the first tracking control unit counts the number of tracks traversed by the first light beam. The first tracking control unit then controls the moving velocity of the first light beam so that the moving velocity varies in conformity to a velocity profile. On the other hand, the second tracking control unit does not have the ability to count the number of tracks traversed by the second light beam. The second tracking control unit therefore merely controls the position of the second light beam so as to bring the second light beam to the tracking state. At this time, the moving velocity of the second light beam does not decrease significantly. The second light beam may therefore deflect from a target track. Moreover, for assisting the second light beam in tracking a target track reliably, it must be awaited that the moving velocity of the second light beam decreases sufficiently. It therefore takes much time to access the target track.

The present applicant has proposed a two-beam pickup type optical disk drive in an effort to solve the aforesaid problems. The disk drive is disclosed in the Japanese Unexamined Patent Publication No. 9-204670.

However, a problem underlies the optical disk drive described in the patent publication. When the first light beam is accelerating or traveling at a constant velocity, a large error may occur in the count of tracks traversed by the first light beam or second light beam. In this case, the positions of the first and second light beams that have reached a target track may be largely deviated from each other in a radial direction. Consequently, the actions for bringing a light beam to a tracking state get unstable.

Factors causing the large error in the count of tracks traversed by the first light beam or second light beam include a defect in an optical disk, a flaw thereon, or deterioration of quality of a tracking error signal. Consequently, the count of tracks indicates a smaller number of tracks than the number of actually traversed tracks.

Figure 2:
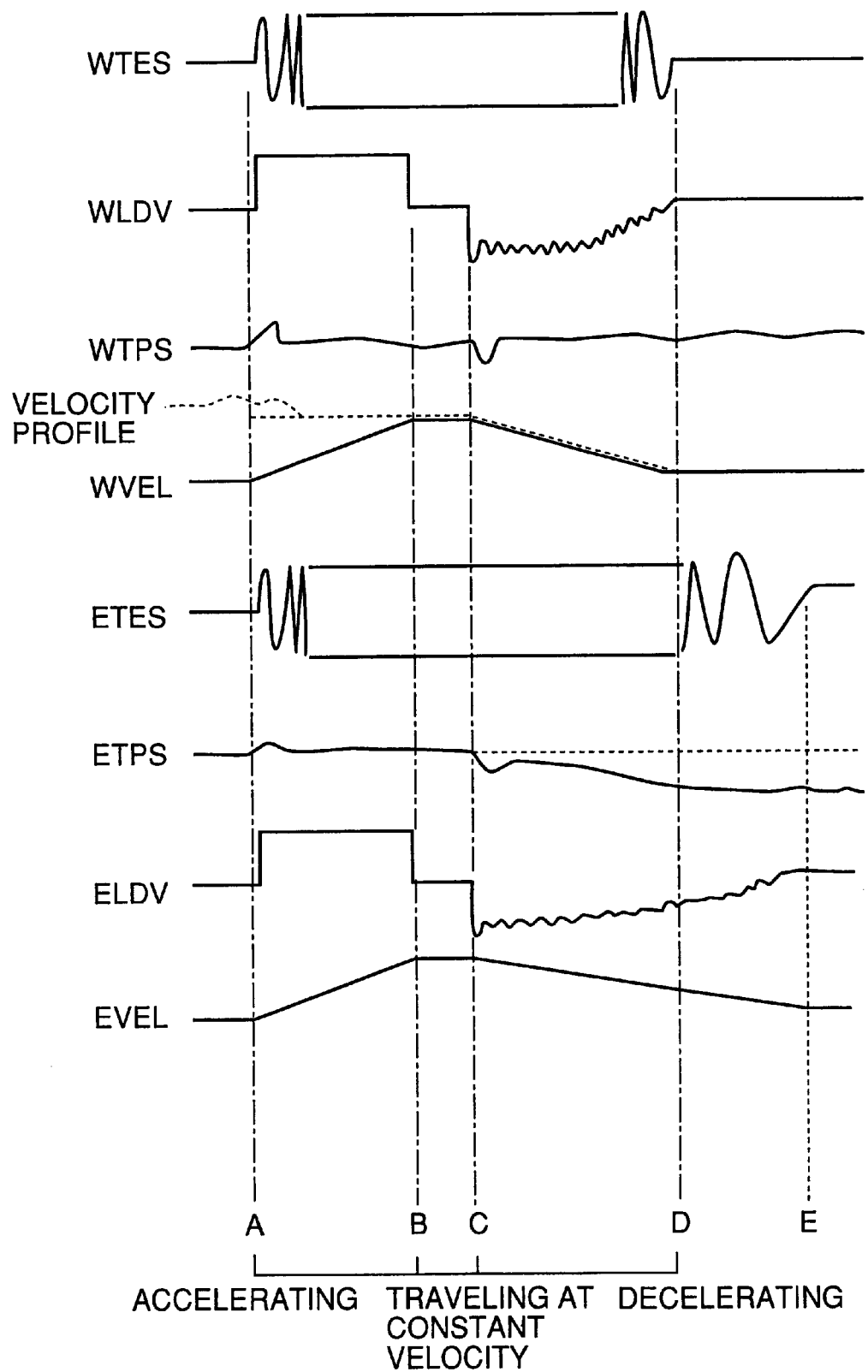
FIG. 2 is a diagram showing the waveform of signals supplied when the optical disk driven shown in FIG. 1 accesses a track.

FIG. 2 is a waveform diagram showing actions made by the conventional optical disk when an error occurs between the count of tracks and the number of traversed tracks.

As shown in FIG. 2, for example, the first light beam is accelerating or traveling at a constant velocity (between time instants A and C). Assume that the count of tracks traversed by the second light beam is smaller than the number of actually traversed tracks. In this state, the number of remaining tracks to be traversed by the second light beam is larger than the number of remaining tracks ranging from a track at point (time instant C), at which the first light beam starts decelerating, to a target track. Consequently, when the second light beam is brought to a tracking state (time instant B), the second light beam deflects largely from the optical head. The actions for bringing the second light beam to the tracking state get therefore unstable. Moreover, even if the second light beam is brought to the tracking state, the track tracked by the second light may be different from the one tracked by the first light beam.

Moreover, the count of tracks traversed by the second light beam may be larger than the number of actually traversed tracks. Even in this case, the actions for bringing the second light beam to the tracking state are unstable.

Next, A control method for an optical disk drive in accordance with an embodiment of the present invention, and an optical disk drive in accordance therewith will be described with reference to the drawings.

Figure 3:
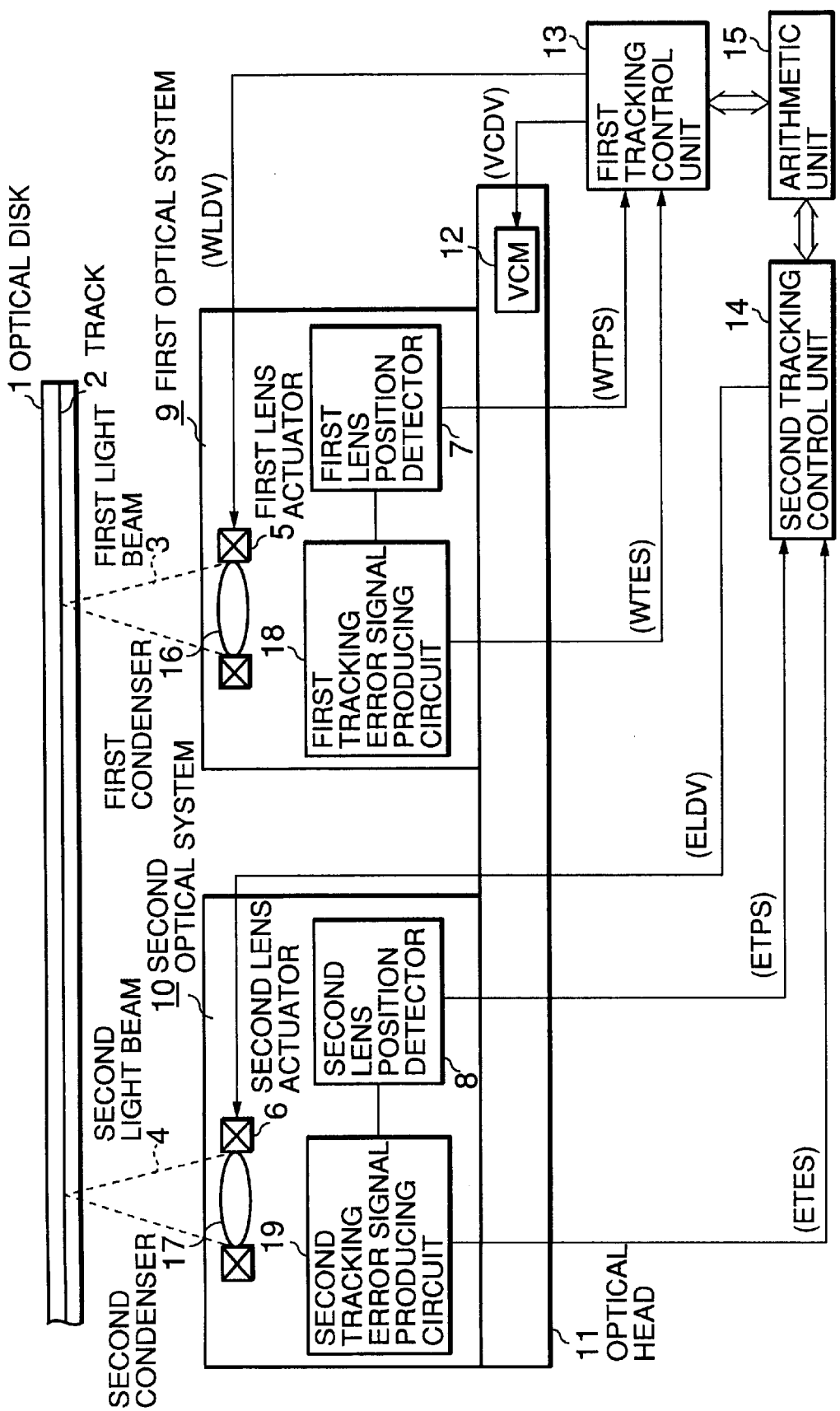
FIG. 3 is a block diagram showing the configuration of an optical disk drive in accordance with an embodiment of the present invention.

Referring to FIG. 3, an optical disk drive of a two-beam pickup type will be described. An optical head 11 has a first optical system 9, a second optical system 10, and a VCM 12. The first optical system 9 records or reproduces information using a first light beam 3. The second optical system 10 deletes information using a second light beam 4. The VCM 12 drives the optical head 11 in a radial direction of an optical disk 1. The term "radial direction" employed hereinafter will means a radial direction of the optical disk 1.

The first optical system 9 has a first condenser 16, first lens actuator 5, a first lens position detector 7, and a first tracking error signal producing circuit 18. The first condenser 16 converges or irradiates the first light beam 3 on or to a predetermined track 2 on the optical disk 1. The first lens actuator 5 drives the first condenser 16 in a radial direction. The first lens position detector 7 optically detects a positional deviation in radial direction of the first condenser 16 from the optical head 11, and converts the positional deviation into an electric signal (first position signal WTPS). The first tracking error signal producing circuit 18 produces a first tracking error signal WTES used to assist the first light beam 3 in tracking the predetermined track 2.

The second optical system 10 has a second condenser 17, a second lens actuator 6, a second lens position detector 8, and a second tracking error signal producing circuit 19. The second condenser 17 converges or irradiates the second light beam 4 to or on the predetermined track 2 on the optical disk 1. The second lens actuator 6 drives the second condenser 17 in a radial direction. The second lens position detector 8 optically detects a positional deviation in a radial direction of the second condenser 17 from the optical head 11, and converts the positional deviation into an electric signal (second position signal ETPS). The second tracking error signal producing circuit 19 produces a second tracking error signal ETES used to assist the second light beam 4 in tracking the predetermined track 2.

The first optical system 9 and the second optical system 10 each have an actuator and focusing error signal producing unit for focusing and controlling the first light beam 3 or second light beam 4. These components bear no direct relation to the present invention. The description and illustration of the components will therefor be omitted.

A first tracking control unit 13 receives the first tracking error signal WTES and first position signal WTPS at intervals of a certain cycle Ts. The first tracking control unit 13 also receives the number of zero-voltage crossings (namely, the number of tracks traversed by the first light beam 3) by which first tracking error signal WTES has passed through 0 V. The first tracking control unit 13 then digitizes the signals and the number of zero-voltage crossings and outputs the digital signals to an arithmetic unit 15. By the way, the arithmetic unit 15 outputs a command signal instructing driving of the first lens actuator 5 at intervals of the certain cycle Ts. The first tracking control unit 13 converts the command signal into an analog form, and outputs the analog signal as a driving signal WLDV to the first lens actuator 5. Moreover, the first tracking control unit 13 converts a command signal instructing driving of the VCM 12 into an analog form, and outputs the resultant signal as a driving signal VCDV to the VCM 12.

On the other hand, a second tracking control unit 14 samples the second tracking error signal ETES and the second position signal ETPS at intervals of the certain cycle Ts. The second tracking control unit 14 also samples the number of zero-voltage crossings (namely the number of tracks traversed by the second light beam 4) by which the second tracking error signal ETES has passed through 0 V. The second tracking control unit 14 digitizes the signals and the number of zero-voltage crossings and outputs the resultant digital signals to the arithmetic unit 15. By the way, the arithmetic unit 15 outputs a command signal instructing driving of the second lens actuator 6 at intervals of the certain cycle Ts. The second tracking control unit 14 converts the command signal into an analog form, and outputs the resultant signal as a driving signal ELDV to the second lens actuator 6.

The arithmetic unit 15 samples the first tracking error signal WTES, first position signal WTPS, second tracking error signal ETES, and the second position signal ETPS at intervals of the certain cycle Ts. The arithmetic unit 15 also samples the number of tracks traversed by the first light beam 3 and the number of tracks traversed by the second light beam 4 at the intervals thereof. The arithmetic unit 15 performs arithmetic operations to control the first light beam 3 and the second light beam 4. The arithmetic unit 15 outputs command signals used to drive the first lens actuator 5, second lens actuator 6, and the VCM 12. The cycle Ts is preferably set to a value that is twenty times or more larger than a frequency standard referenced for tracking servo control (for example, approximately 50 kHz).

In the foregoing configuration, the first tracking control unit 13 assists the first light beam 3 in accessing a target track. Specifically, the first tracking control unit 13 counts the number of tracks traversed by the first light beam 3 at intervals of the certain cycle Ts, and outputs the count to the arithmetic unit 15.

The arithmetic unit 15 calculates the moving velocity of the first light beam 3. The arithmetic unit 15 performs arithmetic operations to control the velocity of the first light beam 3 so that the velocity varies in conformity to a velocity profile relevant to distances to a target track. The arithmetic unit 15 outputs a velocity control command to the first tracking control unit 13. Moreover, the first position signal WTPS is used to perform arithmetic operations to control the position of the optical head 11 so that the optical head 11 follows the first light beam 3. The arithmetic unit 15 then outputs a position control command concerning the position of the optical head 11 to the first tracking control unit 13.

Moreover, if the first light beam 3 is accelerating or traveling at a constant velocity, the arithmetic unit 15 performs arithmetic operations to control the position of the second light beam 4 for locking the second light beam 4 on to the optical head 11. The arithmetic unit 14 then outputs a position control command concerning the position of the second light beam 4 to the second tracking control unit 14.

Furthermore, if the first light beam 3 starts decelerating, the number of remaining tracks ranging from a track at the deceleration start point of the first light beam to the target track is used to update the number of remaining tracks to be traversed by the second light beam 4. Moreover, if they first light beam 3 is decelerating, the number of tracks traversed by the second light beam 4 is counted in order to calculate the moving velocity of the second light beam 4. Arithmetic operations are then performed to control the moving velocity so that the moving velocity varies in conformity to a velocity profile relating to distances to the target track. Consequently, a velocity control command is output to the second tracking control unit 14.

As mentioned above, when the first light beam 3 is decelerating, the velocity of the second light beam 4 is controlled. The moving velocity of the second light beam 4 having reached the target track is therefore sufficiently low. Consequently, the actions for bringing the second light beam to a tracking state are stabilized.

Moreover, when the first light beam 3 starts decelerating, the number of remaining tracks to be traversed by the second light beam 4 is updated to be equal to the number of remaining tracks to be traversed by the first light beam 3. It will not therefore take place that when the second light beam 4 is brought to the tracking state, the second light beam largely deflects in a radial direction.

Next, the first tracking control unit 13 and the second tracking control unit 14 shown in FIG. 3 will be described in conjunction with FIGS. 4 to 6.

Figure 4:
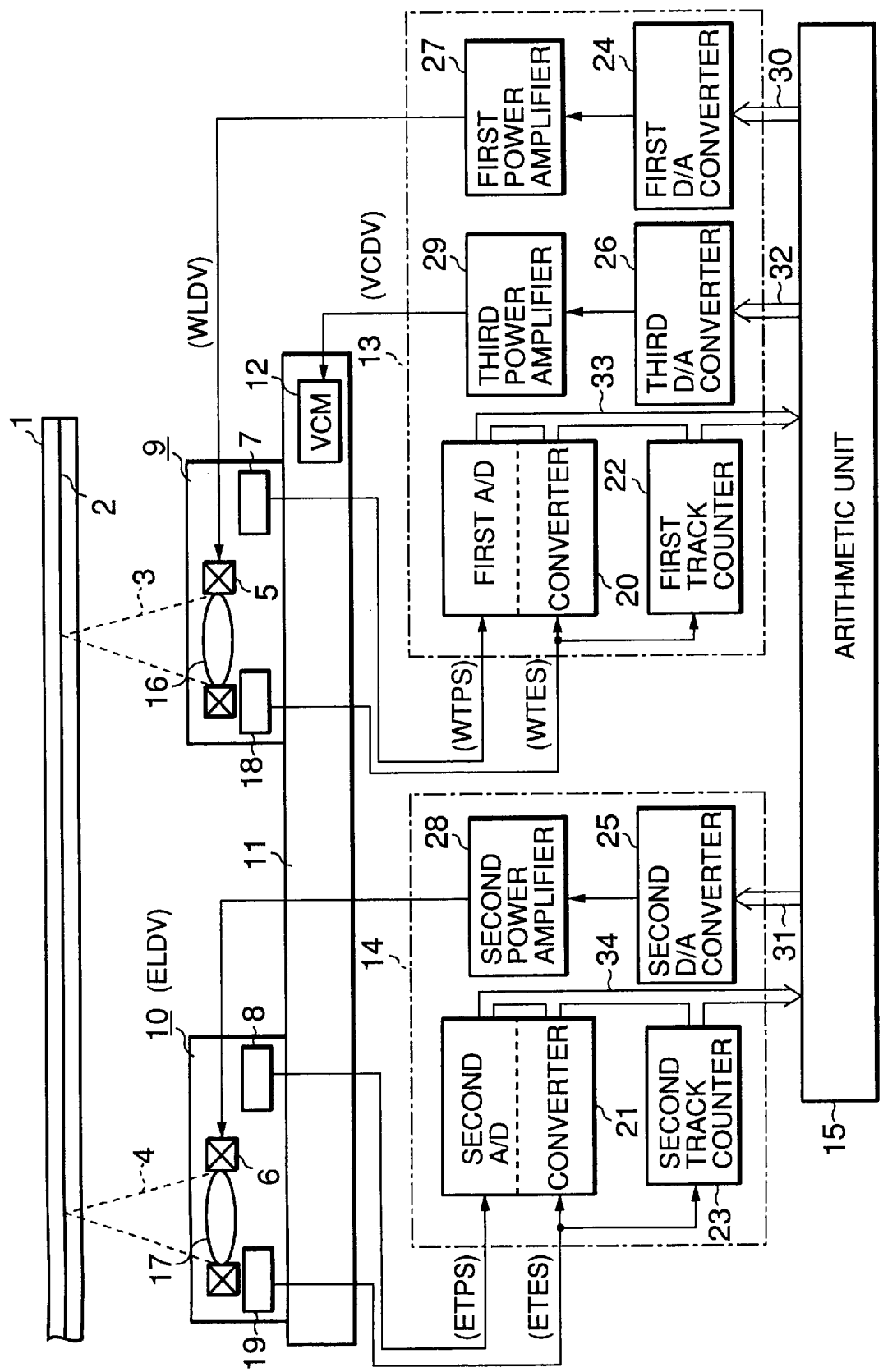
FIG. 4 is a block diagram showing an example of the configurations of first and second tracking control units shown in FIG. 3.

FIG. 4 is a block diagram showing an example of the configurations of the first tracking control unit and the second tracking control unit shown in FIG. 3. FIG. 5 is a flowchart describing a procedure of accessing a track carried out by the optical disk drive shown in FIG. 3. FIG. 6 is a waveform diagram showing signals supplied inside the optical disk drive shown in FIG. 3 when a track is accessed.

Referring to FIG. 4, the first tracking control unit 13 consists of a first A/D converter 20, a first track counter 22, a first D/A converter 24, a third D/A converter 26, a first power amplifier 27, and a third power amplifier 29.

The first A/D converter 20 samples a first tracking error signal WTE and first position signal WTPS at intervals of a certain cycle Ts, and digitizes the signals. The first A/D converter 20 then outputs the digital signals to the arithmetic unit 14 over a bus 33.

The first track counter 22 counts the number of times by which the first tracking error signal WTES has crossed 0 V within the cycle Ts, and outputs the count to the arithmetic unit 15 over the bus 33. The first D/A converter 24 converts a driving command 30 (digital signal) into an analog signal, and outputs the analog signal to the first power amplifier 27. Herein, the driving command 30 is produced by the arithmetic unit 15 in order to instruct driving of the first lens actuator 5. The first power amplifier 27 supplies power needed to drive the first lens actuator 5. An output of the first power amplifier 27 serves as a driving signal WLDV used to drive the first lens actuator 5. The velocity and position of the first light beam 3 are controlled owing to these components.

Moreover, the third D/A converter 26 converts a VCM driving command 32 (digital signal) produced by the arithmetic unit 15 into an analog signal, and outputs the analog signal to the third power amplifier 29. The third power amplifier 29 supplies power needed to drive the VCM 12. An output of the third power amplifier serves as a VCM driving signal VCDV. The position of the optical head 11 is controlled owing to these components.

On the other hand, the second tracking control unit 14 consists of a second A/D converter 21, a second track counter 23, a second D/A converter 25, and a second power amplifier 28.

The second A/D converter 21 samples a second tracking error signal ETES and the second position signal ETPS at intervals of a certain cycle Ts, and converts them into digital signals. The second A/D converter 21 then outputs the digital signals to the arithmetic unit 15 over a bus 34.

The second track counter 23 counts the number of times by which the second tracking error signal ETES has crossed 0 V within the cycle Ts, and outputs the count to the arithmetic unit 15 over the bus 34.

The second D/A converter 25 converts a driving command 31 (digital signal) into an analog signal, and outputs the analog signal to the second power amplifier 28. Herein, the driving command 31 is produced by the arithmetic unit in order to instruct driving of the second lens actuator.

The second power amplifier 28 supplies power needed to drive the second lens actuator 6. The output of the second power amplifier 28 serves as a driving signal ELDV used to drive the second lens actuator 6. The velocity and position of the second light beam 4 are controlled owing to these components.

In an effort to assist the first light beam 3 in tracking a target track, the arithmetic unit 15 samples the first tracking error signal WTES (digitized signal) at intervals of the certain cycle Ts. The arithmetic unit 15 then performs arithmetic operations to compensate the phase of the first light beam 3, thus specifying the position control characteristic thereof according to which the position of the first light beam is controlled. The arithmetic unit 15 then outputs the driving command 30 instructing driving of the first lens actuator 5 to the first D/A converter 24.

Moreover, for accessing the target track, an output of the first track counter 22 is sampled at intervals of the certain cycle Ts in order to calculate the moving velocity of the first light beam 3. The driving command 30 instructing driving of the first lens actuator 5 is calculated so that the moving velocity varies in conformity to the velocity profile stored in advance in the arithmetic unit 15. The driving command 30 is then output to the first D/A converter 24. Incidentally, the velocity profile is realized with a function table listing velocities associated with distances to the target track. A velocity profile employed will provide a velocity of zero in relation to a distance to the target track that is zero.

Moreover, when the second light beam 4 is tracking the target track, the arithmetic unit 15 samples the second tracking error signal ETES (digitized signal) at intervals of the certain cycle Ts. The arithmetic unit 15 performs arithmetic operations to compensate the phase of the second light beam 4, thus controlling the position thereof. The arithmetic unit 15 then outputs the driving command 31 instructing driving of the second lens actuator 6 to the second D/A converter 25.

On the other hand, assume that the second light beam 4 must access the target track. When the first light beam 3 is accelerating or traveling at a constant velocity, the second position signal ETPS (digitized signal) is sampled at intervals of the certain cycle Ts. Arithmetic operations are performed to compensate the phase of the second light beam 4, thus controlling the position thereof so that the second light beam 4 follows the optical head 11. When the first light beam 3 is decelerating, the output of the second track counter 23 is sampled at intervals of the certain cycle Ts in order to calculate the moving velocity of the second light beam 4. The driving command 31 instructing driving of the second lens actuator 6 is calculated so that the moving velocity varies in conformity to the velocity profile stored in advance in the arithmetic unit 15. The driving command 31 is then output to the second D/A converter 25.

The arithmetic unit 15 samples the first position signal WTPS (digitized signal) at intervals of the certain cycle Ts irrespective of whether the first light beam 3 is tracking or accessing the target track. The arithmetic unit 15 performs arithmetic operations to compensate the phase of the first light beam 3 so that the optical head 11 follows the first light beam 3. The arithmetic unit 15 then outputs a VCM driving command 32 to the third D/A converter 26.

Before a track is accessed, information of the number of tracks ending with the target track is stored as the number of remaining tracks to be traversed by the first light beam 3 in the arithmetic unit 15. The information of the number of tracks ending with the target track is sent from a host computer (not shown) in advance.

Next, A control method for an optical disk drive will be described in conjunction with FIG. 5.

Figure 5:
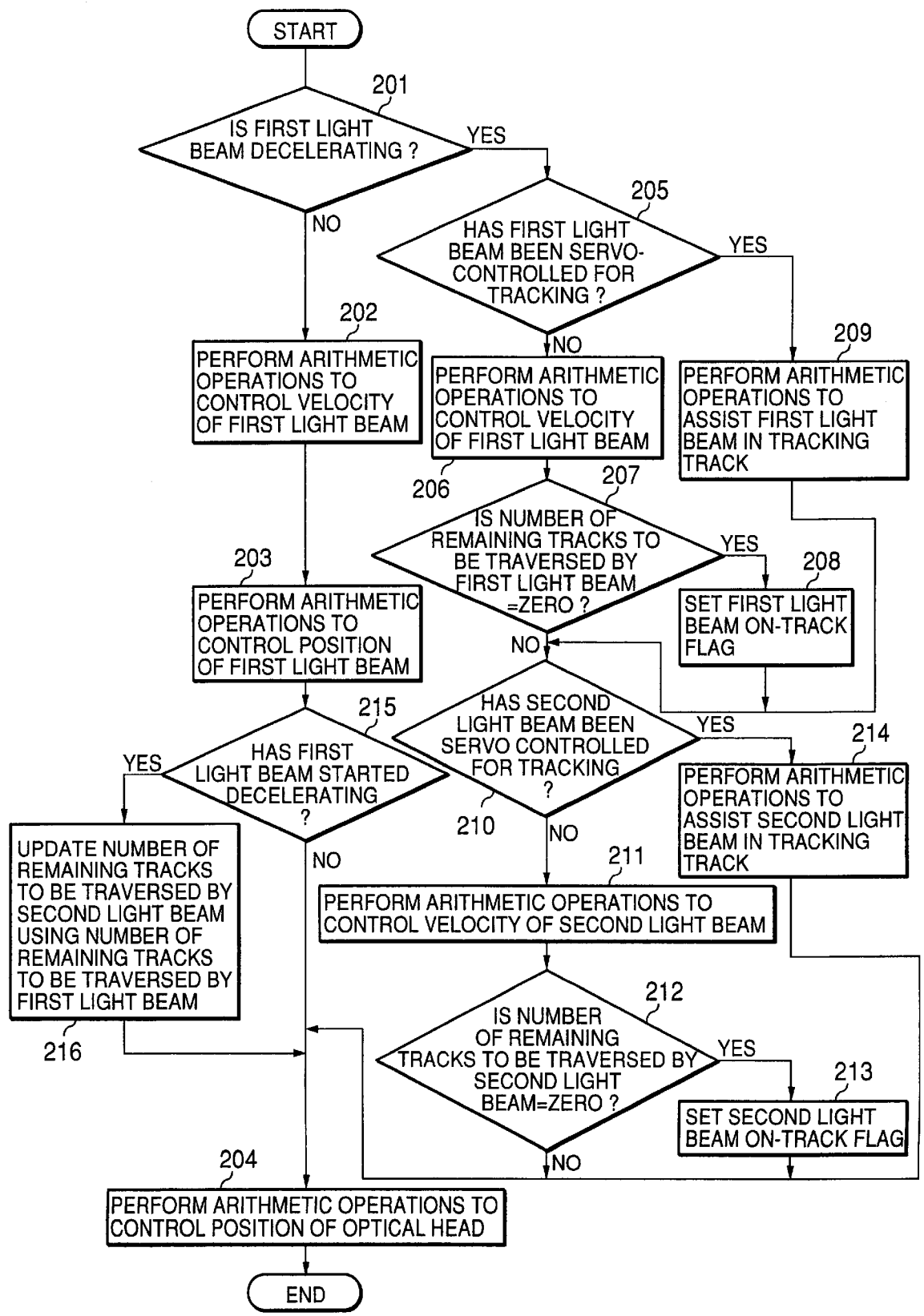
FIG. 5 is a flowchart describing a procedure of accessing a track carried out by the optical disk drive shown in FIG. 3.

The optical disk drive of the present invention carries out a processing sequence described in FIG. 5 at intervals of the certain cycle Ts. Arithmetic operations are thus carried out to control the first light beam 3, second light beam 4, and optical head 11. The sequence described in FIG. 5 is executed at intervals of the certain cycle Ts.

Referring to FIG. 5, the arithmetic unit 15 first judges whether the first light beam 3 is decelerating (step 201). Herein, a period required until the moving velocity of the first light beam 3 comes to vary in conformity to the velocity profile (between time instants A and B) is judged as an acceleration period. A period (between time instants B and C) if which the first light beam 3 is traveling at a constant velocity is judged as a constant velocity period. If the constant velocity period, the moving velocity thereof varies in conformity to the velocity profile. A period (between time instants C and D) if which the first light beam 3 is decelerating is judged as a deceleration period. If the deceleration period, the moving velocity thereof varies in conformity to the velocity profile.

Figure 6:
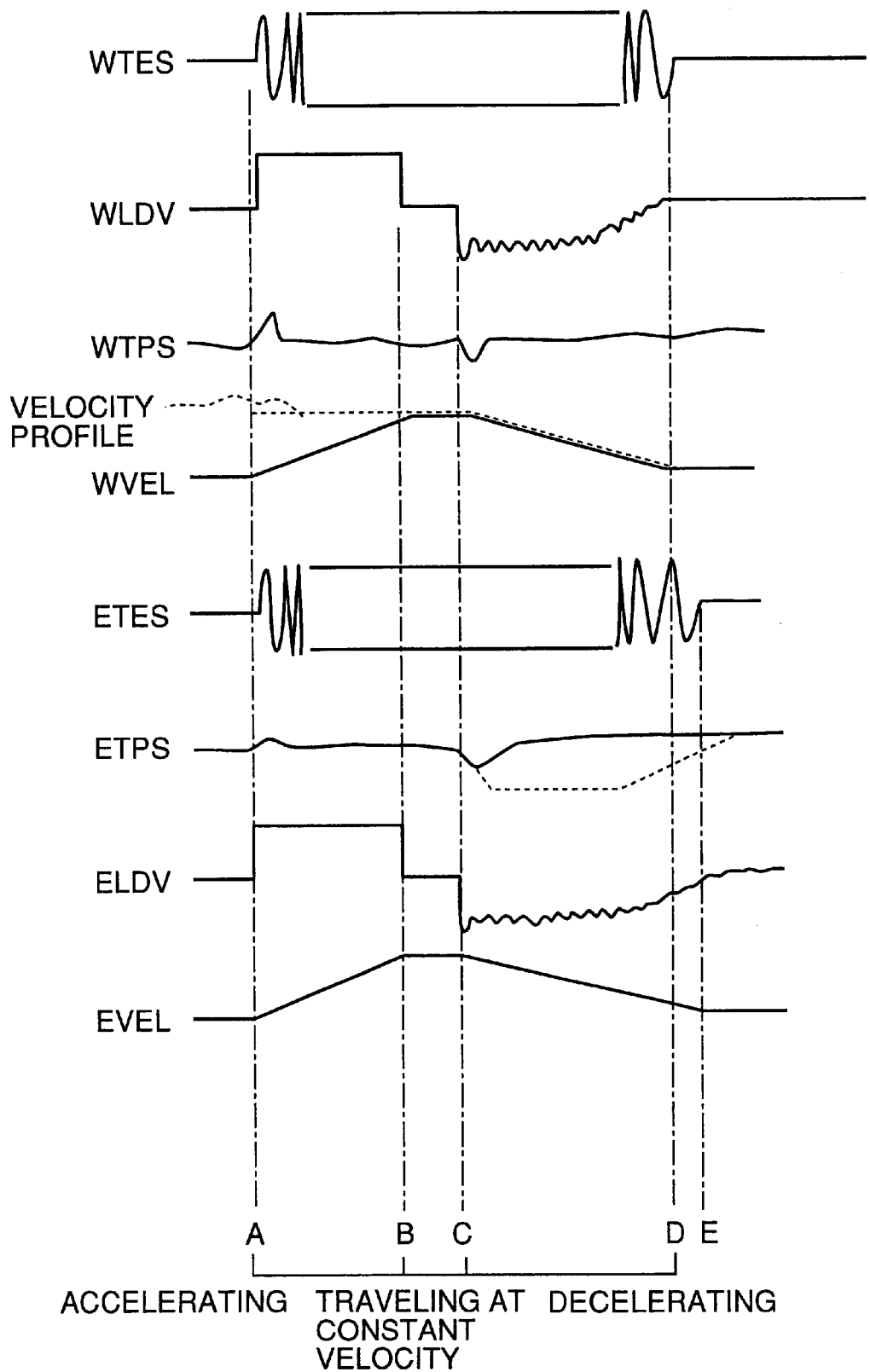
FIG. 6 is a diagram showing the waveform of signals produced inside the optical disk drive shown in FIG. 3 when a track is accessed.

Referring to FIG. 6, a waveform WVEL represents the moving velocity of the first light beam 3, and a waveform EVEL represents the moving velocity of the second light beam 4.

It may be judged at step 201 that the first light beam 3 is not decelerating (accelerating or traveling at a constant velocity) (between time instants A and C in FIG. 6). In this case, the arithmetic unit 15 performs arithmetic operations to control the velocity of the first light beam 3 (step 202). At this time, the arithmetic unit 15 counts the number of times by which the first tracking error signal WTES has crossed 0 V within the cycle Ts. Herein, the number of times corresponds to the number of tracks traversed by the first light beam 3. The arithmetic unit 15 thus calculates the moving velocity of the first light beam 3. A velocity is retrieved from the velocity profile, which is stored in the arithmetic unit 15, in relation to the number of remaining tracks. A difference between the retrieved velocity and the calculated moving velocity of the first light beam is multiplied by a proper gain. The product is output as the driving command 30 instructing driving of the first lens actuator 5. At this time, the number of remaining tracks ending with the target track is updated. The first tracking control unit 13 drives the first lens actuator 5 according to the driving command 30 that instructs driving of the first lens actuator.

Next, the arithmetic unit 15 performs arithmetic operations to control the position of the second light beam 4 (step 203). At this time, the position is controlled so that the second light beam 4 can follow the optical head 11. The arithmetic unit 15 adds a position compensation value to the second position signal ETPS (digitized signal) so as to control the position of the second light beam, and multiplies the resultant value by the proper gain. The arithmetic unit 15 then outputs the product as the driving command 31 instructing driving of the second lens actuator 6. The second tracking control unit 14 drives the second lens actuator 6 according to the driving command 32 that instructs driving of the second lens actuator 6.

Incidentally, only when the first light beam 3 is moved by a distance equivalent to a one-third or more of a maximum movable range of the optical head 11, the first light beam 3 undergoes the constant velocity period (between time instants B and C). When the first light beam 3 accesses a track within the one-third of the maximum movable range, the first light beam does not undergo the constant velocity period. A velocity profile employed therefore represents a variation permitting the first light beam to shift from the acceleration period to the deceleration period.

If the constant velocity period of the first light beam 3 (between time instants B and C), the arithmetic unit 15 always monitors whether the first light beam 3 starts decelerating (step 215). The arithmetic unit 15 performs arithmetic operations to control the position of the optical head 11 until the first light beam 3 starts decelerating (step 204). Moreover, when the first light beam 3 reaches a deceleration start point (time instant C), the arithmetic unit 15 calculates the number of remaining tracks ending with the target track of the first light beam 3. The number of remaining tracks to be traversed by the second light beam 4 is updated with the same value as the number of tracks to be traversed by the first light beam 3 (step 216).

Herein, arithmetic operations are executed at step 204 for controlling the position of the optical head 11. The arithmetic operations are performed to control the position of the optical head 11 so as to lock the optical head 11 on to the first light beam 3. The arithmetic unit 15 adds a phase compensation value to the first position signal WTPS, and multiplies the sum by a proper gain. The arithmetic unit 15 then outputs the product as the VCM driving command 32 to the first tracking control unit 13. The first tracking control unit 13 drives the VCM 12 according to the VCM driving command 32.

Position control for the optical head 11 is carried out in the same way irrespective of whether a track is being accessed or tracked. The description of the position control will be omitted hereinafter.

The foregoing actions for giving control when the first light beam 3 is accelerating or traveling at a constant velocity will be summarized below. First, the first light beam 3 is moved according to the velocity profile. The optical head 11 is locked on to the first light beam, and the second light beam 4 is locked on to the optical head 11. The first light beam 3, second light beam 4, and optical head 11 move while maintaining their positional relationships relative to a track which are attained before they accessed the track.

Next, a description will be made of processing to be performed by the arithmetic unit 15 when the first light beam 3 is decelerating. Incidentally, when it is said that the first light beam 3 is decelerating, it means that the first light beam 3 is controlled to decelerate according to the velocity profile.

First, the arithmetic unit 15 judges whether the first light beam 3 has been servo-controlled for tracking (step 205). At the deceleration start point (time instant C), the first light beam 3 has not reached the target track. The arithmetic operations are continued in order to control the velocity of the fixed light beam 3 (step 206).

Next, the arithmetic unit 15 judges whether the number of remaining tracks to be traversed by the first light beam 3 becomes zero (step 207). When the number of remaining tracks becomes zero, that is, when the first light beam 3 reaches the target track (time instant D), a first light beam on-track flag is set (step 208).

In the next cycle (after time instant D) and thereafter, it is judged at step 205 whether the first light beam 3 has been servo-controlled for tracking. Thereafter, arithmetic operations are executed to control tracking by the first light beam 3 (step 209).

Next, the arithmetic unit 15 judges whether the second light beam 3 has been servo-controlled for tracking (step 210). At the deceleration start point (time instant C) at which the first light beam 3 starts decelerating, the second light beam 4 has not reached the target track. The arithmetic unit 15 therefore performs arithmetic operations to control the velocity of the second light beam 4 (step 211).

At step 211, the moving velocity of the second light beam 4 is calculated from the number of tracks traversed by the second light beam 4. A velocity is retrieved from the velocity profile, which is stored in advance in the arithmetic unit 15, in relation to the number of remaining tracks to be traversed by the second light beam 4. A difference between the retrieved velocity and the moving velocity of the second light beam 4 is multiplied by a proper gain. The product is output as the driving command 31 instructing driving of the second lens actuator 6. At the same time, the number of remaining tracks to be traversed by the second light beam 4 is updated. The second tracking control unit 14 drives the second lens actuator 6 according to the driving command 31 that instructs driving of the second lens actuator 6.

Next, the arithmetic unit 15 judges whether the number of remaining tracks to be traversed by the second light beam 4 becomes zero (step 212). When the number of remaining tracks becomes zero, that is, the second light beam 4 reaches the target track (time instant E), a second light beam on-track flag is set (step 213). Consequently, in the next cycle or thereafter (after time instant E), it is judged whether the second light beam 4 has been servo-controlled for tracking. Arithmetic operations are then executed in order to control tracking by the second light beam (step 214).

The foregoing actions for giving control when the first light beam 3 is decelerating will be summarized below. First, the velocities of the first light beam 3 and the second light beam 4 are varied in conformity to the velocity profile. The optical head 11 is locked on to the first light beam 3 and decelerated. Incidentally, the same velocity profile is used to perform the arithmetic operations for controlling the velocity of the first light beam 3 and that of the second light beam 4. The timing according to which the first light beam 3 is servo-controlled for tracking (time instant D) may be opposite to the timing according to which the second light beam 4 is servo-controlled for tracking (time instant E).

When the first light beam 3 starts decelerating (time instant C), the velocities of the first light beam 3 and the second light beam 4 are controlled mutually independently. At this time, a positional deviation of the second light beam 4 from the optical head 11 may, as indicated with a dashed line in the waveform of the second position signal ETPS in FIG. 6, get larger during deceleration. This is attributable to the fact that the first lens actuator 5 and the second lens actuator 6 are different from each other in terms of a force constant or circuit constant. However, when the first light beam 3 and the second light beam 4 are servo-controlled for tracking, the positional relationship between them is unchanged from that attained before they start accessing a track. In other words, if the first light beam 3 and the second light beam 4 are tracking the same track at the start of access, they will track the same track after they accessed the track.

When the first light beam 3 is accelerating or traveling at a constant velocity (between time constants A and C), the number of tracks traversed by the second light beam 4 will not be counted. When the first light beam 3 starts decelerating (time instant C), the number of remaining tracks to be traversed by the second light beam 4 is updated to be equal to the number of remaining tracks to be traversed by the first light beam 3. Consequently, the counts of tracks to be traversed by the first light beam and the count of tracks to be traversed by the second light beam 4 will be able to be devoid of an error. It will therefore not take place that when the second light beam 4 accesses a track, it deflects largely from the optical head 11. The actions for bringing the second light beam 4 to the tracking state will therefore be stabilized.

Furthermore, the numbers of tracks to be traversed by the first light beam 3 and the second light beam 4 respectively are counted mutually independently. Consequently, positioning can be achieved with high precision. This leads to a shortened access time.

What is claimed is:

1. A control method for an optical disk drive, said optical disk drive having an optical head, said optical head irradiating an optical disk by first and second light beams, said optical disk drive recording or reproducing information by using said first light beam and deleting information by using said second light beam, said control method comprising the steps of:

calculating the moving velocity of said first light beam and controlling the moving velocity of said first light beam so that said first light beam reaches a target track on said optical disk for the shortest time and that the moving velocity varies in conformity to a first velocity profile predetermined;

controlling the position of said optical head so as to follow said first light beam;

while said first light beam is accelerating or traveling at a constant velocity, controlling the position of said second light beam so that said second light beam follows said optical head;

when said first light beam starts decelerating, updating data of a distance of said second light beam to said target track using data of a distance of said first light beam to said target track; and while said first light beam is decelerating, calculating the moving velocity of said second light beam and controlling the moving velocity of said second light beam so that the moving velocity varies in conformity to a second velocity profile predetermined.

2. A control method for an optical disk drive as claimed in claim 1, wherein said method further comprises the steps of:

determining the position of said first light beam in a radial direction of said optical disk by detecting positional deviations of said first light beam from said optical head and said target track; and determining the position of said second light beam in said radial direction of said optical disk by detecting positional derivations of said second light beam from said optical head and said target track.

3. A control method for an optical disk drive as claimed in claim 1, wherein said method further comprises the steps of:

determining the moving velocity and the data of a distance of said first light beam to the target track by counting the number of tracks traversed by said first light beam; and determining the moving velocity and the data of a distance of said second light beam to the target track by counting the number of tracks traversed by said second light beam.

4. A control method for an optical disk drive as claimed in claim 2, wherein said method further comprises the steps of:

determining the moving velocity and the data of a distance of said first light beam to the target track by counting the number of tracks traversed by said first light beam; and determining the moving velocity and the data of a distance of said second light beam to the target track by counting the number of tracks traversed by said second light beam.

5. An optical disk drive comprising:

a first optical system outputting a first light beam used to record or reproduce information;

a second optical system outputting a second light beam used to delete information;

an optical head having said first and said second optical systems mounted therein and being controlled so that said first and said second optical systems can move in a radial direction of an optical disk;

a first position detecting unit for detecting the position of said first light beam in said radial direction of said optical disk, a second position detecting unit for detecting the position of said second light beam in said radial direction of said optical disk; and an arithmetic unit for performing arithmetic operations to move said first and said second light beams onto a target track of said optical disk and to control said first and said second light beams so as to look up to the target track, wherein said arithmetic unit performs the steps of:

calculating the moving velocity of said first light beam and controlling the moving velocity of said first light beam so that said first light beam reaches a target track on said optical disk for the shortest time and that the moving velocity varies in conformity to a predetermined velocity profile pre-set;

controlling the position of said optical head so as to follow said first light beam;

while said first light beam is accelerating or traveling at a constant velocity, controlling the position of said second light beam so that said second light beam follows said optical head;

when said first light beam starts decelerating, updating data of a distance of said second light beam to said target track using data of a distance of said first light beam to said target track; and while said first light beam is decelerating, calculating the moving velocity of said second light beam and controlling the moving velocity of said second light beam so that the moving velocity varies in conformity to a predetermined velocity profile.

6. An optical disk drive as claimed in claim 5, wherein said first position detecting unit has a first lens position detector for detecting a positional deviation of said first light beam from said optical head in a radial direction of said optical head and a first error signal producing circuit for detecting a positional deviation of said first light beam from said target track in a radial direction of said optical disk;

said second position detecting unit having a second lens position detector for detecting a positional deviation of said second light beam from said optical head in said radial direction of said optical head and a second error signal producing circuit for detecting a positional deviation of said second light beam from said target track in said radial direction of said optical disk.

7. An optical disk drive as claimed in claim 6, wherein said arithmetic unit calculates the moving velocity and the data of a distance of said first light beam to the target rack by counting the number of tracks traversed by said first light beam;

said arithmetic unit further calculating the moving velocity and the data of a distance of said second light beam to the target track by counting the number of tracks traversed by said second light beam.

8. An optical disk drive as claimed in claim 7, wherein said arithmetic unit calculates the moving velocity and the data of a distance of said first light beam to the target track by counting the number of tracks traversed by said first light beam;

said arithmetic unit further calculating the moving velocity and the data of a distance of said second light beam to the target track by counting the number of tracks traversed by said second light beam.

* * * * *